United States Patent
Okamoto et al.

(10) Patent No.: US 7,972,544 B2
(45) Date of Patent: Jul. 5, 2011

(54) RESIN MULTILAYER INJECTION MOLDING METHOD

(75) Inventors: Akio Okamoto, Sanyouonoda (JP); Kazuaki Miyamoto, Ube (JP)

(73) Assignee: Ube Machinery Corporation, Ltd., Ube-shi (JP)

( * ) Notice: Subject to any disclaimer, the term of this patent is extended or adjusted under 35 U.S.C. 154(b) by 262 days.

(21) Appl. No.: 12/311,826

(22) PCT Filed: Oct. 12, 2007

(86) PCT No.: PCT/JP2007/069990
§ 371 (c)(1),
(2), (4) Date: Apr. 15, 2009

(87) PCT Pub. No.: WO2008/047724
PCT Pub. Date: Apr. 24, 2008

(65) Prior Publication Data
US 2010/0308500 A1   Dec. 9, 2010

(30) Foreign Application Priority Data
Oct. 18, 2006   (JP) .................. 2006-284125

(51) Int. Cl.
*B29C 45/16* (2006.01)
*B29C 45/66* (2006.01)
*B29C 45/70* (2006.01)
(52) U.S. Cl. ............ 264/45.2; 264/255; 264/328.7
(58) Field of Classification Search ........... 264/45.2, 264/45.5, 46.4, 55, 255, 328.7
See application file for complete search history.

(56) References Cited

U.S. PATENT DOCUMENTS
5,702,810 A   12/1997   Koseki et al.
6,887,407 B2 *   5/2005   Okamoto ............... 264/40.5

FOREIGN PATENT DOCUMENTS
| JP | 54-086550 | 7/1979 |
| JP | 06-234133 | 8/1994 |
| JP | 08-309779 | 11/1996 |
| JP | 10-315262 | 12/1998 |
| JP | 2000-176963 | 6/2000 |
| JP | 2002-283389 | 10/2002 |

OTHER PUBLICATIONS

U.S. Appl. No. 11/990,780, filed Feb. 21, 2008, Akio Okamoto et al.
International Search Report mailed Jan. 15, 2008, issued on PCT/JP2007/069990.

* cited by examiner

*Primary Examiner* — Jill L Heitbrink
(74) *Attorney, Agent, or Firm* — Edwards Angell Palmer & Dodge LLP

(57) ABSTRACT

While a second layer resin is being charged, a movable platen is moved backward to reach a given movable platen position (S1) to enlarge the capacity of a second cavity. After the completion of charging of the resin, a toggle mechanism is promptly driven to reduce the second cavity capacity to reach a given movable platen position (S2), and after the lapse of a given time, the toggle mechanism is driven again to enlarge the second cavity capacity to reach a given movable platen position (S3). Thus, a high quality multilayer injection molded article which has small variations in the wall thickness, dimension, and mass and which is free from deformation or warpage can be stable obtained.

4 Claims, 3 Drawing Sheets

RESIN MULTILAYER INJECTION MOLDING METHOD

TECHNICAL FIELD

The present invention relates to a resin multilayer injection molding method including injection molding at least two kinds of resin molding materials to form a multilayer structure.

BACKGROUND ART

In recent years, as a measure for producing a resin molded article for use in automotive parts, home electronics, etc., a molding member has been increasingly employed which forms a resin molding material into a multilayer structure in a mold simultaneously with molding so as to improve the aesthetic properties and diversity of the resin molded article or omit processes of a molding process for reducing cost.

For example, in order to improve the aesthetic properties and diversity of a molded article, a molding method for forming a structure in which a resin layer that is soft, a colored layer of high quality, or a foamed layer is laminated on the surface of the molded article has been proposed. According to the molding method, a first layer resin molding material is injected and charged in a cavity, and then molding is performed by enlarging a cavity capacity when a second layer resin molding material is injected and charged. For a mold clamping mechanism of an injection molding device for use in this molding method, a direct pressure type mold clamping mechanism provided with a hydraulic mold clamping cylinder with which the enlargement of a cavity capacity is relatively easily controlled has been employed (Patent Document 1).

In this molding method, the enlargement amount of a cavity capacity has an influence on the thickness, dimensions, etc., of a molded article and is an important factor. Thus, the enlargement amount of a cavity capacity is required to be controlled with high precision and high reproducibility.

However, according to such a molding method employing a conventional direct pressure type mold clamping mechanism, control precision of a hydraulic cylinder fluctuates due to compressibility or changes in the viscosity due to temperature changes of hydraulic oil. Moreover, due to a long cylinder stroke, control responsibility is low. There has been a problem that, since a ratio of the control amount of cylinder stroke to the movement amount of mold is 1:1, a molded article with a highly precise thickness cannot be obtained due to low position control properties when multilayer injection molding is performed.

In contrast, a method of controlling a mold platen position of a toggle type mold clamping unit has been disclosed which increases control precision by controlling moving backward of a movable platen by a cross head whose movement amount is larger than the moving amount of the movable platen. According to this method, the interval between the movable platen and a stationary platen can be held constant with high precision (Patent Document 2).

However, according to a conventional molding method including enlargement of a cavity capacity by bending a toggle mechanism using a toggle type mold clamping system, there still are the following problems. More specifically, with a toggle mechanism in a bending state when a space for charging a second layer resin molding material is secured by driving the toggle mechanism for a mold opening to enlarge a cavity capacity after the second layer resin molding material is injected and charged, holding force cannot be obtained which is necessary and sufficient for holding the movable platen position when a charging pressure of the second layer resin acts on the movable mold surface. Therefore, there has been a problem that, when a resin charging pressure acts on the movable mold surface, the movable platen moves backward to further enlarge a cavity capacity, resulting in failure to maintain the thickness precision of a molded article.

Patent Document 3 is mentioned as another prior art reference.

Patent Document 1: JP-A-1979/086550
Patent Document 2: JP-A-1996/309779
Patent Document 3: US/5702810

DISCLOSURE OF INVENTION

The present invention has been made in view of the above-described conventional problems. An object of the present invention is to provide a resin multilayer injection molding method using a toggle type mold clamping mechanism which stably provides a high quality multilayer injection molded article having small variations in the wall thickness, dimension, or mass of a molded article and is free from deformation or warpage. As a result of further studies, it has been found that the above-described objects are achieved by the following measures.

More specifically, the present invention provides a resin multilayer injection molding method. The method includes, using an injection unit for injecting and charging at least two kinds of resin molding materials in a cavity and a mold clamping unit for opening and closing a mold and performing mold clamping using a toggle mechanism, injecting and charging a first layer resin molding material in the cavity, and then molding; moving backward a movable platen to reach a given movable platen position (S0) by mold opening to enlarge the cavity capacity to form a second cavity between the first layer resin molding material and the cavity surface; and injecting and charging a second resin molding material in the formed second cavity to obtain a multilayer molded article. In the method, the movable platen is moved backward to enlarge the second cavity capacity to reach a given movable platen position (S1) while the second layer resin is being charged, and, after the completion of the charging of the resin, the toggle mechanism is promptly driven to reduce the second cavity capacity to reach a given movable platen position (S2), and after the lapse of a given time, the toggle mechanism is driven again to enlarge the second cavity capacity to reach a given movable platen position (S3).

In the resin multilayer injection molding method according to the present invention, the enlargement of the second cavity capacity while the second layer resin is being injected is preferably performed by moving backward of the movable platen when a cross head position of the toggle mechanism is held, and a resin charging pressure acts on the movable platen surface. Or, the enlargement of the second cavity capacity while the second layer resin is being injected is preferably performed by controlling moving backward of the cross head in such a manner that the movable platen moves backward synchronizing with the resin filling speed.

In the resin multilayer injection molding method according to the present invention, it is preferable that the second layer resin molding material contain a foaming agent, and that the second cavity be enlarged to reach a given movable platen position (S3) by driving the toggle mechanism, and then the second cavity be further enlarged to reach a given movable platen position (S4) by driving the toggle mechanism.

In the resin multilayer injection molding method according to the present invention, the second layer resin is charged in a cavity under a low pressure, compressed under a low pressure, and then released from compressive force. Thus, a high quality resin multilayer injection molded article which is free from variations in the wall thickness, dimension, and mass, deformation, and warpage can be obtained.

Moreover, according to the resin multilayer injection molding method of the present invention, a high quality resin multilayer injection molded article which has a foamed layer with a desired foaming ratio and a desired foam diameter and is free from variations in the wall thickness, dimension, and mass, deformation, and warpage can be obtained.

Figure 1:
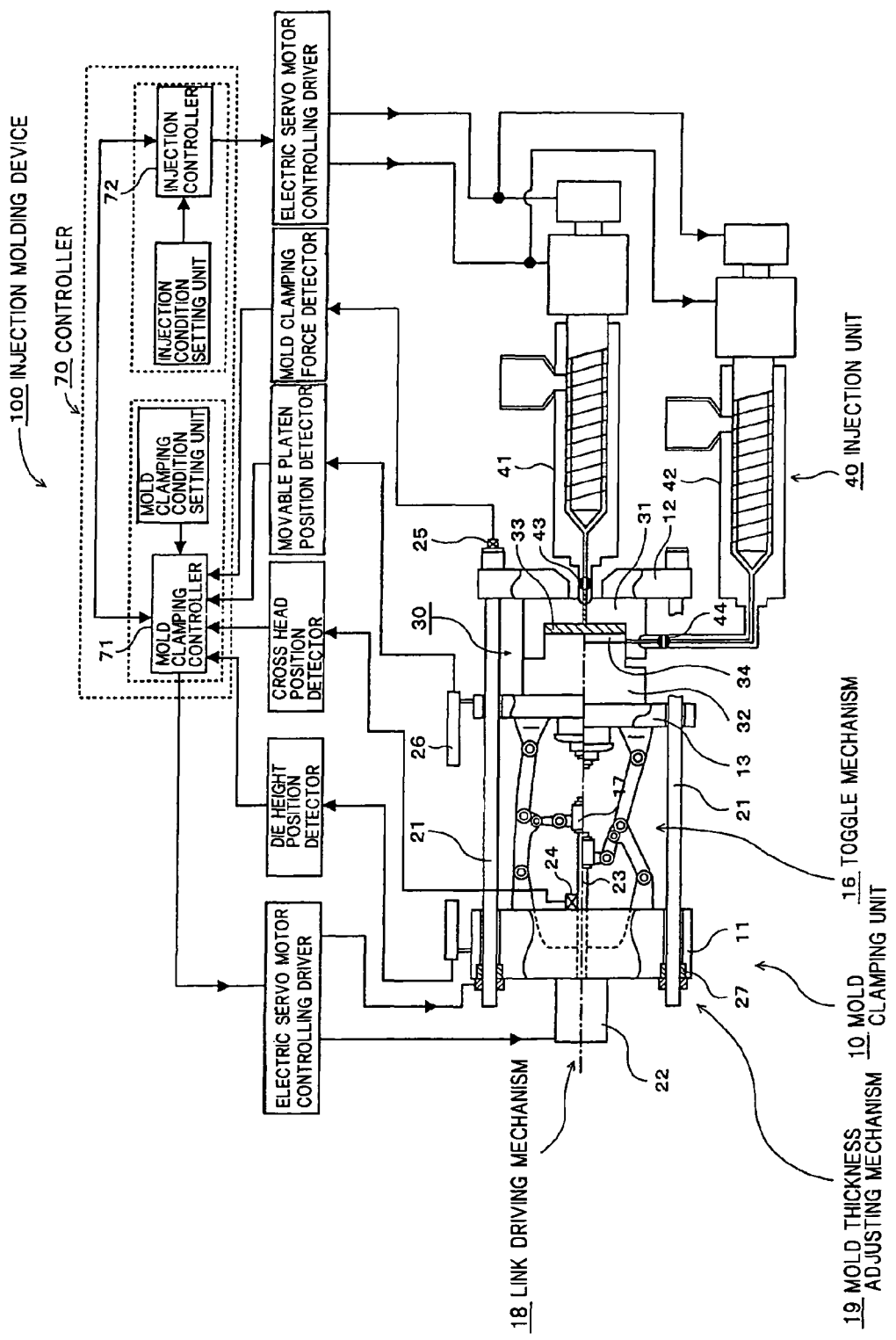
FIG. 1 is a general view of an injection molding device for use in a resin multilayer injection molding method according to the present invention.

REFERENCE NUMERALS 10 clamping unit
12 stationary platen
13 movable platen
16 toggle mechanism
18 link driving mechanism
30 mold
31 stationary mold
32 movable mold
33 cavity
34 second cavity
40 injection unit
41 first injection unit
42 second injection unit
70 controller
71 mold clamping side controller
72 injection side controller
100 injection molding device
S0 movable platen position (second cavity set point)
S1 movable platen position (second cavity enlargement set point)
S2 movable platen position (second cavity reduction set point)
S3 movable platen position (second cavity pressure relaxation set point)
S4 movable platen position (foamed cavity set point)
t1 pressure holding time
t2 delay time (formation of foaming nucleus)

BEST MODES FOR CARRYING OUT THE INVENTION

Hereinafter, best modes for carrying out the present invention will be described with reference to the drawings.

Figure 2:
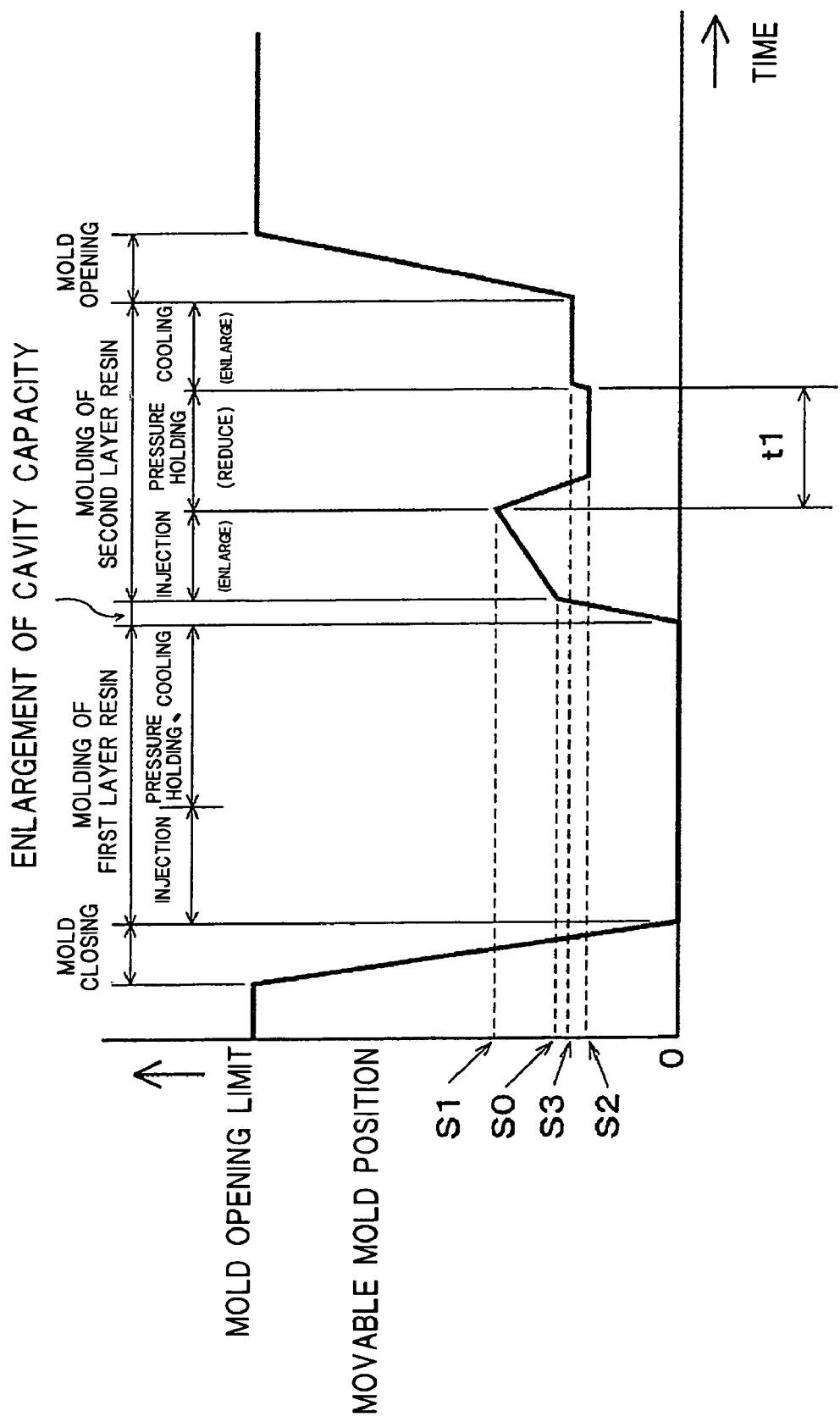
FIG. 2 is a view illustrating an embodiment of the resin multilayer injection molding method according to the present invention, and illustrating changes in a movable platen position in molding a second layer resin.
Figure 3:
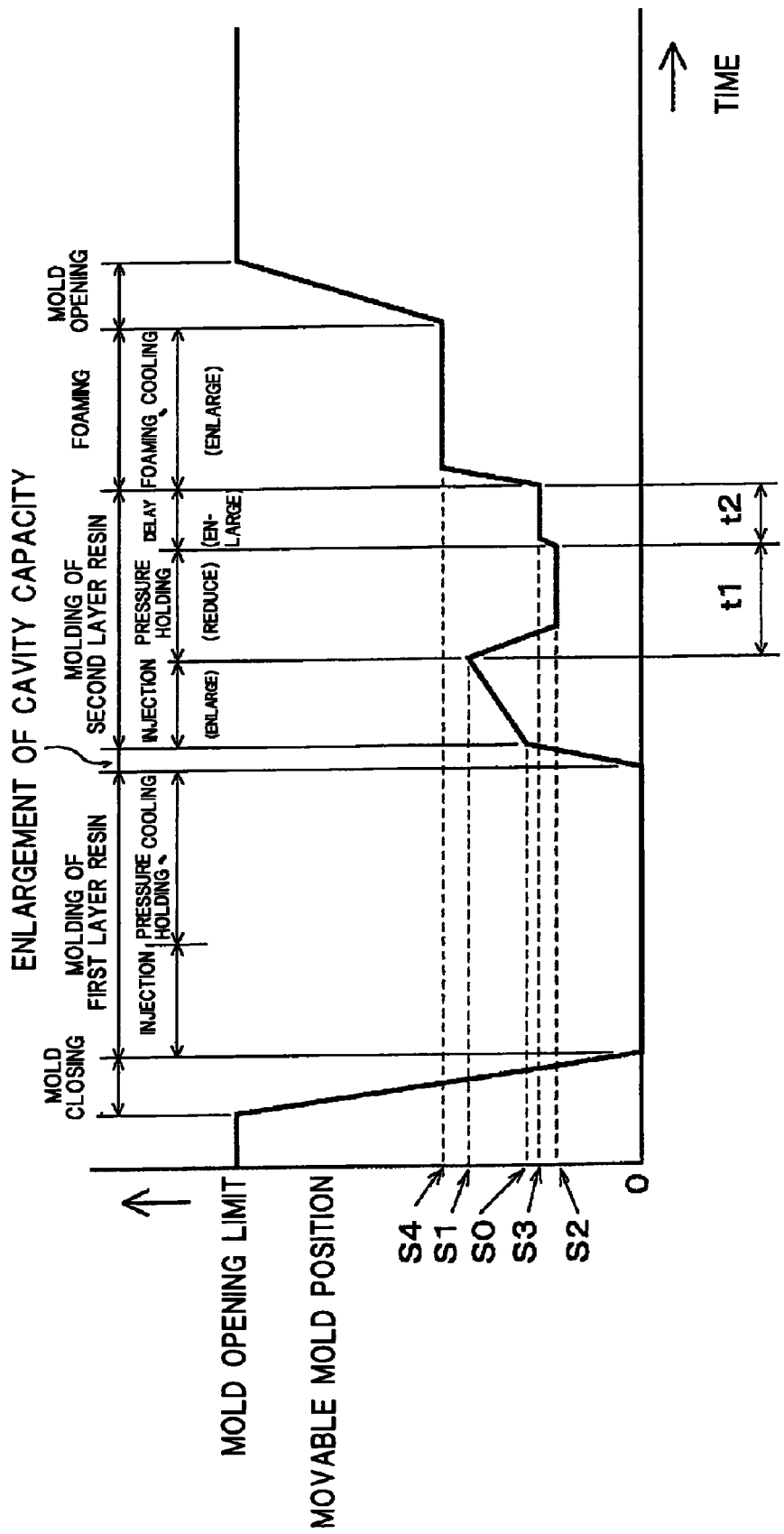
FIG. 3 is a view illustrating another embodiment of the resin multilayer injection molding method according to the present invention, and illustrating changes in a movable platen position in molding a resin containing a foaming agent in a second layer.

FIGS. 1 to 3 are views relating to the best modes for carrying out the present invention. Among the above, FIG. 1 is a general view of an injection molding device for use in a resin multilayer injection molding method according to the present invention. FIG. 2 is a view illustrating an embodiment of the resin multilayer injection molding method according to the present invention, and illustrating changes in a movable platen position in molding a second layer resin. FIG. 3 is a view illustrating another embodiment of the resin multilayer injection molding method according to the present invention, and illustrating changes in a movable platen position in molding a resin containing a foaming agent in a second layer.

First, the injection molding device will be described. As illustrated in FIG. 1, the injection molding device 100 for use in the present invention has a mold clamping unit 10, an injection unit 40, a controller 70 for controlling the mold clamping unit 10 and the injection unit 40, and a mold 30. The mold 30 is provided with a stationary mold 31 and a movable mold 32 as illustrated in FIG. 1. The stationary mold 31 and the movable mold 32 are in a semi-pressing structure for engaging with each other at an engaging part, and are structured so as to form a cavity 33 by the combination of a cavity surface formed on the stationary mold 31 and a cavity surface formed on the movable mold 32. A second cavity 34 is formed by moving backward the movable mold 32 after the first layer resin molding material has been injected and charged.

The engaging part of the semi-pressing structure is provided along the entire circumference of the mold for preventing the resin molding materials charged in the cavity 33 and the second cavity 34 from leaking out of the cavities even when the capacity of each of the cavity 33 and the second cavity 34 is enlarged or reduced after the resin molding materials have been injected and charged. The second cavity in the present invention is formed when the movable mold 32 moves backward (mold opening) after the first layer resin is molded, and refers to a gap formed between the first layer resin and the stationary cavity surface or between the first layer resin and the movable cavity surface.

The mold clamping unit 10 illustrated in FIG. 1 has a link housing 11, a stationary platen 12, a movable platen 13, a link driving mechanism 18 having an electric servo motor 22 as a driving source, a toggle mechanism 16 which is driven by the link driving mechanism 18, and a controlling drive for drive controlling the electric servo motor 22. The movable platen 13 is guided by a tie bar 21 placed between the stationary platen 12 and the link housing 11 so that the movable platen 13 can move back and forth with the movable mold 32 by means of the toggle mechanism 16.

A cross head driving shaft 23 of the link driving mechanism 18 of the mold clamping unit 10 is provided with a stroke sensor 23 as a position sensor for detecting the position of a cross head 17. The sensor 24 can accurately detect the position of the cross head 17.

In the mold clamping unit 10, the stroke sensor 24 is disposed as a position sensor for detecting the position of the cross head 17. It is a matter of course that the position sensor for detecting the position of the cross head 17 is not limited thereto, and a method of detecting the position of the cross head 17 by a sensor built in the electric servo motor 22 may be applied.

The clamping unit 10 has a mold clamping force sensor 25 as a sensor for detecting mold clamping force at one end of a stationary side of the tie bar 21. The mold clamping force sensor 25 detects mold clamping force by detecting the elongation amount of the tie bar 21.

The clamping unit 10 is disposed as a mold opening/closing stroke sensor for detecting a mold opening/closing stroke in such a manner that a movable platen position sensor 26 detects the position of the movable platen 13. On the basis of the measurement values of the movable platen position sensor 26, the opening/closing stroke of the mold 30 and the position of the movable platen are detected. In response to a detection signal from these detectors, mold opening/closing is controlled by an output signal of a mold clamping controller 71.

The mold clamping unit 10 is provided with a mold thickness adjustment mechanism 19 for attaching molds having different thicknesses. By rotatably driving a movable nut 27 which has been inserted in a link housing 11 and screwed in the tie bar 21 by a driving member (not shown), the toggle mechanism 16 moves back and forth. By driving the mold thickness adjustment mechanism 19, mold clamping force can be set.

The toggle mechanism 16 for use in the mold clamping unit 10 shown in FIG. 1 has a five-joint double toggle system with five link joints and controls movement of the movable platen 13 and mold clamping force by operating the cross head 17 in a mold opening/closing direction. A four-joint double toggle mechanism with four joints may be applied to the present invention. The cross head 17 is driven by the link driving mechanism 18 employing the electric servo motor 22. However, a hydraulic cylinder or the like may be used as a driving member for the cross head 17.

Next, the structure of the injection unit 40 for use in this embodiment will be described. The injection unit 40 shown in FIG. 1 basically contains a first injection unit 41 for supplying a first layer resin molding material in the cavity 33 and a second injection unit 42 for supplying a second layer resin molding material in the second cavity 34. Each injection unit has a barrel, a screw placed inside a barrel and having a flight, and a hopper for supplying a resin molding material in a barrel, and is provided with a screw moving member for moving the screw back and forth and a screw rotating member for rotating the screw. The first injection unit 41 and the second injection unit 42 have shut-off valves 43 and 44 for opening and closing a resin passage.

The injection units 41 and 42 are structured so that a pellet-like resin molding material is supplied in a barrel from a hopper by the rotation of the screw with the screw rotating member. The supplied pellet-like resin molding material is heated with a heater attached to the barrel, kneaded and compressed by the rotation of the screw for melting, and then transported to the front of the screw. The molten resin transported to the front of the screw passes through the shut-off valves 43 and 44 attached to the top end of the barrel by the screw which moves forward by means of a screw moving member, and injected and charged in the cavities 33 and 34 in the mold through a nozzle.

As shown in FIG. 1, the first injection unit 41 supplies the molten resin in the cavity 33 from the axial direction of the injection molding device 100 of the stationary mold 31 and the second injection unit 42 supplies the molten resin in the second cavity 34 from a direction crossing the axis of the injection molding device 100 of the stationary mold 31. For the resin molding material for use in the first layer and second layer, widely used engineering plastics, such as widely used thermoplastic resins, such as polyethylene (PE), polypropylene (W), and ABS resin, polycarbonate (PC), polyacetal (POM), and polyamide (nylon) can be used.

In the injection unit 40, the screw moving member and the screw rotating member are provided with an electric servo motor as a driving source. A hydraulic cylinder, a hydraulic motor, etc., may be used as a driving source.

The controller 70 for use in this embodiment basically contains a mold clamping controller 71 for controlling the clamping unit 10, a mold clamping condition setting unit for setting mold clamp conditions, an injection controller 72 for controlling the injection unit 40, and an injection condition setting unit for setting injection conditions.

Hereinafter, the resin multilayer injection molding method according to the present invention using the injection molding device 100 structured as above will be described. The molding operation is performed according to the following processes.

As shown in FIG. 2, the resin multilayer injection molding method according to one embodiment of the present invention includes the following processes of mold closing, molding of a first layer resin, enlargement of the capacity of a cavity, molding of a second layer resin, and mold opening.

(1A) In the mold closing process, mold closing is performed by driving the link driving mechanism 18 on the basis of the mold closing conditions set beforehand with the mold clamping condition setting unit, and a given mold clamping force is made to act on the mold 30 (the toggle mechanism is locked). The mold clamping force is detected by the mold clamping force sensor 25.

(2A) In the process of molding a first layer resin after mold closing, the shut-off valve 43 of the first injection unit 41 is opened to inject and charge the first layer molten resin in the cavity 33. After the completion of the charging of the first layer molten resin and pressure holding, the shut-off valve 43 is closed. Subsequently, the first layer resin is cooled while holding the mold clamping force until a given cooling time set according to the cooled and solidified state of the first layer resin has elapsed (the toggle mechanism is locked).

(3A) In the process of enlarging the cavity capacity after the completion of the cooling of the first layer resin, mold opening is performed on the basis of a set point (S0) of the movable platen position set with the mold clamping condition setting unit to move backward the movable platen 13 to release the mold clamping force, and the cavity capacity 33 is enlarged, thereby forming the second cavity 34 (the toggle mechanism is bent).

(4A) In the process of molding the second layer resin after the second cavity 34 has been formed, the shut-off valve 44 of the second injection unit 42 is opened to inject and charge the second layer molten resin in the second cavity 34. While the second layer resin is being charged, the movable platen 13 moves backward to enlarge the second cavity capacity until the movable platen position reaches a set point (S1). After the completion of the injection and charging of the second layer resin, the toggle mechanism 16 is promptly driven to move the movable platen position to a set point (S2) at a given rate set beforehand to reduce the capacity of the second cavity 34, whereby a holding pressure is made to act on the second layer resin from the movable mold 32 side. Subsequently, after a given pressure holding time t1 has passed, the toggle mechanism 16 is driven again to move backward the movable platen position at a given rate set beforehand to a set point (S3) to enlarge the second cavity capacity, the holding pressure is relaxed, and the movable platen position is held until a given cooling time has elapsed (the toggle mechanism is bent).

The enlargement of the cavity capacity while the second layer resin is being charged is controlled when the position of the cross head 17 in which the movable platen position is located at the set point (S0) is held, and the resin charging pressure acts on the surface of the movable mold 32 to move backward the movable platen 13 to the set point (S1). The tie bar 21 is pressed and elongated with the moving backward of the movable platen 13. The mold opening amount according to a resin charging behavior is controlled by detecting the elongation of the tie bar 21. The enlargement of the cavity capacity while the second layer resin is being charged can be controlled by controlling the cross head 17 in which the movable platen position is located at the set point (S0) so that the movable platen 13 moves backward to the set point (S1), synchronizing with the resin filling speed. By selectively using either one of the methods, the enlargement of the cavity capacity while the second resin layer is being charged can be controlled.

(5A) In the mold opening process after the completion of cooling, the movable platen 13 is moved backward to a set point of a mold opening position set with the mold clamping condition setting unit. After a detection signal of the movable platen position sensor 26 detects the set point of a retracted position, the electric servo motor 22 is controlled so that the mold opening position is held, thereby holding the position of the cross head 17 (the toggle mechanism is bent). Subsequently, a molded article is extruded from the mold 30, taken out of the injection molding device 100, and is in a standby state for receiving a start signal of the following molding.

Here, in the enlargement and reduction of the cavity capacity, a ratio of the movement stroke of the movable platen 13 to the movement stroke of the cross head 17 immediately before the movable platen 13 contacts the stationary platen 12 is approximately 10:1. A ratio of the movement rate of the movable platen 13 to the movement rate of the cross head 17 is also approximately 10:1. In other words, in the mold clamping unit 10 having the toggle mechanism 16, when the position of the cross head 17 is controlled, the movable platen 13 is controlled with a precision about 10 times that of the cross head position, which allows highly precise control of the mold opening/closing position.

In the control of the position of the movable platen 13, the position of the movable platen 13 is controlled on the basis of position data of the cross head 17, which is obtained by storing, as the position data, the relationship between the position of the cross head 17 and the position of the movable platen 13 which have been detected when the movable platen 13 of the mold clamping unit 10 located at a mold touch point is moved in the mold opening direction utilizing magnification properties of the toggle mechanism 16. According to this method, the capacity enlargement amount and the capacity reduction amount of the cavity are controllable with high precision.

Next, as shown in FIG. 3, the resin multilayer injection molding method according to another embodiment of the present invention includes the following processes of molding of a first layer resin, enlargement of the capacity of a cavity, molding of a second layer resin containing a foaming agent, foaming, and mold opening.

(1B) In the mold closing process, mold closing is performed by driving the link driving mechanism 18 on the basis of the mold closing conditions set beforehand with the mold clamping condition setting unit, and a given mold clamping force is made to act on the mold 30 (the toggle mechanism is locked). The mold clamping force is detected by the mold clamping force sensor 25.

(2B) In the process of molding the first layer resin after mold closing, the shut-off valve 43 of the first injection unit 41 is opened to inject and charge a first layer molten resin in the cavity 33. After the completion of the charging of the first layer molten resin and pressure holding, the shut-off valve 43 is closed. Subsequently, the first layer resin is cooled while holding the mold clamping force until a given cooling time set according to the cooled and solidified state of the first layer resin has elapsed (the toggle mechanism is locked).

In the process of enlarging the cavity capacity after the completion of the cooling of the first layer resin, mold opening is performed on the basis of the set point (S0) of the movable platen position set with the mold clamping condition setting unit, the movable platen 13 is moved backward, the mold clamping force is released, and the cavity capacity 33 is enlarged, thereby forming the second cavity 34 (the toggle mechanism is bent).

(4A) In the process of molding the second layer resin containing a foaming agent after the second cavity 34 is formed, the shut-off valve 44 of the second injection unit 42 is opened to inject and charge the second layer molten resin in the second cavity 34. While the second layer resin is being charged, the movable platen 13 moves backward to enlarge the second cavity capacity until the movable platen position reaches the set point (S1). After the completion of the injection and charging of the second layer resin, the toggle mechanism 16 is promptly driven to move the movable platen position forth to the set point (S2) at a given rate to reduce the capacity of the second cavity 34, and a holding pressure is made to act on the second layer resin from the side of the movable mold 32. Subsequently, after a given pressure holding time t1 has passed, the toggle mechanism 16 is driven again to move backward the movable platen position to the set point (S3) at a given rate set beforehand to enlarge the second cavity capacity, the holding pressure is relaxed, and the movable platen position is held until a given delay time has elapsed, thereby forming a skin layer and a foaming nucleus (the toggle mechanism is bent).

(5B) In a foaming process after the formation of the skin layer and the foaming nucleus, the toggle mechanism 16 is driven again to move backward the movable platen 13 at a given rate set beforehand until the movable platen position reaches the set point (S4) to enlarge the cavity capacity. The position of the cross head 17 is held at the movable platen position (S4) and controlled, thereby forming a foaming layer having a given foaming ratio.

(6B) In the mold opening process after the formation of the foaming layer, the movable platen 13 is moved backward to a set point of the mold opening position set with the mold clamping condition setting unit. After a detection signal of the movable platen position sensor 26 detects the set point of a retracted position, the electric servo motor 22 is controlled so that the mold opening position is held, and the position of the cross head 17 is held (the toggle mechanism is bent). Subsequently, a molded article is extruded from the mold 30, taken out of the injection molding device 100, and waits for a start signal of the following molding.

Here, the relationship between the set points (S0 to S4) of the movable platen position serving as the enlargement amount and the reduction amount of the cavity capacity which have an influence on the quality of the molded article will be described. The set points (S0 to S4) of the movable platen position are expressed by the movement amount from a mold touch point of the movable mold 32. S0 refers to the movement amount of the movable mold 32 forming the second cavity 34.

(a) The set point of S1 is set to a value larger than the set point of S0 (S0<S1). The movable platen 13 moves backward by the above-described method while the second layer resin is being charged to enlarge the second cavity capacity until the movable platen position reaches S1 from S0. The enlargement of the cavity capacity reduces a resin charging pressure, thereby developing effects of reducing a bias stress of a molded article, degassing in a cavity, and easily charging a resin molding material having poor fluidity, such as polyethylene sulfide (PPS). S1 is preferably a value obtained by adding 0.1 to 5.0 mm to S0.

(b) The set point of S2 is set to a value equivalent to or smaller than the set point of S0 (S2≦S0). After the completion of the charging of the second layer resin, the cavity capacity is promptly reduced, and the charged second layer resin is fully packed in the cavity and held. A pressure holding time t1 between resin flow due to the reduction in cavity capacity and the solidification of a molded article is preferably from 0.5 to 10.0 sec. When a molten resin in which the second layer contains a foaming agent is charged, the retention time of forming a skin layer is set.

(c) The set point of S3 is set to a value larger than the set point of S2 (S2<S3). Stress relaxation of the second layer resin is targeted, and a molded article with less bias stress, deformation, or warpage can be obtained. In the case of polyethylene (PP), polypropylene (PE), ABS plastics, etc., with a small elastic deformation amount, the set point of S3 is preferably a value obtaining by adding 0.1 to 1.0 mm to S2. In the case of thermostat plastic olefin (TPO) with a large elastic deformation amount, the set point of S3 is preferably a value obtaining by adding 0.1 to 2.0 mm to S2. When a molten resin in which the second layer resin contains a foaming agent is charged, a foaming nucleus is formed by reduction in pressure due to the enlargement of a cavity capacity.

(d) The set point of S4 is set to a value larger than the set point of S3 (S3<S4) and set to a molding thickness of a foaming layer. The second layer molten resin contains a foaming agent, and a foaming nucleus is grown to a foaming cell. By intentionally delaying the enlargement of the cavity capacity, adjustment to a resin elongation viscosity suitable for the formation of a foaming cell can be achieved. It is preferable to adjust an enlargement rate of a cavity capacity to the growth rate of a foaming cell. The delay time t2 is preferably from 0.1 to 10.0 sec.

According to the embodiment of the present invention, in the process of molding the first layer resin molding material, mold closing is performed by driving the link driving mechanism 18 on the basis of the mold closing conditions set beforehand with the mold clamping condition setting unit and a given mold clamping force is made to act on the mold 30 (the toggle mechanism is locked). For example, a structure of forming a low pressure mold clamping state where the cross head is set to a suitable intermediate position where the toggle mechanism is locked from a mold touch point where the toggle mechanism is bent or a mold closing holding state where the cross head is set to reach a given position where the movable platen is disposed at a given interval from the mold touch point can be applied. In this case, a structure is preferable in which, after the first layer resin molding material is injected and charged, the toggle mechanism is driven to a locking state where a given clamping force acts.

As is clear from the above description, according to the present invention, a second cavity is formed after the first layer resin molding material is injected and charged, and, when the second layer resin molding material is injected and charged in the second cavity, the movable platen is moved backward to further enlarge the second cavity capacity. After the completion of the charging of the second layer resin molding material, the cavity capacity is promptly reduced to compress the charged resin material, and the cavity capacity is enlarged again to relax the compressive force. Thus, a multilayer molded article with relaxed internal stress, less bias stress, and reduced deformation and warpage can be obtained. Furthermore, since the movable platen position is controlled on the basis of the cross head position data, the capacity enlargement amount and the capacity reduction amount of the cavity can be controlled with high precision, and a laminated injection molded article with small variations in the thickness, dimension, or mass can be stably obtained.

In the molding of a multilayer injection molded article in which the second layer resin molding material contains a foaming agent and forms a foaming layer, the movable platen position is controlled on the basis of the cross head position data. Thus, the enlargement amount of the cavity capacity can be controlled with high precision, and a multilayer injection molded article having a desired foaming cell and a desired foaming layer can be obtained.

INDUSTRIAL APPLICABILITY

The resin multilayer injection molding method according to the present invention is utilized as a measure for producing all kinds of resin molded articles. In particular, the present invention is preferably utilized as a measure for producing a resin molded article for use in automotive parts, home electronics, etc.

The invention claimed is:

1. A resin multilayer injection molding method, comprising:
using an injection unit for injecting and charging at least two kinds of resin molding materials in a cavity and a mold clamping unit for opening and closing a mold and performing mold clamping using a toggle mechanism, injecting and charging a first layer resin molding material in the cavity, and then molding;
moving backward a movable platen to reach a given movable platen position (S0) by mold opening to enlarge the cavity capacity to form a second cavity between the first layer resin molding material and the cavity surface; and
injecting and charging a second resin molding material in the formed second cavity to obtain a multilayer molded article,
wherein the movable platen is moved backward to a given movable platen position (S1) so as to enlarge the second cavity capacity while the second layer resin is being charged, and, after the completion of the charging of the resin, the toggle mechanism is promptly driven to reduce the second cavity capacity by moving the movable platen to a given movable platen position (S2), and after the lapse of a given time, the toggle mechanism is driven again to enlarge the second cavity capacity by moving the movable platen to a given movable platen position (S3), enlarging the resin molding materials.

2. The resin multilayer injection molding method according to claim 1, wherein the enlargement of the second cavity capacity while the second layer resin is being injected is performed by moving backward of the movable platen when a cross head position of the toggle mechanism is held, and a resin charging pressure acts on the movable platen surface.

3. The resin multilayer injection molding method according to claim 1, wherein the enlargement of the second cavity capacity while the second layer resin is being injected is performed by controlling moving backward of the cross head in such a manner that the movable platen moves backward synchronizing with a resin filling speed.

4. The resin multilayer injection molding method according to claim 1, wherein the second layer resin molding material contains a foaming agent; and the second cavity is enlarged by moving the movable platen to a given movable platen position (S3) by driving the toggle mechanism, and then the second cavity is further enlarged by moving the movable platen to a given movable platen position (S4) by driving the toggle mechanism.

* * * * *